United States Patent
Huang et al.

(10) Patent No.: US 10,268,046 B2
(45) Date of Patent: Apr. 23, 2019

(54) CUBE POLARIZER

(71) Applicant: Moxtek, Inc., Orem, UT (US)

(72) Inventors: Austin Huang, Vancouver, WA (US); Dean Probst, West Jordan, UT (US); Bin Wang, Lindon, UT (US); Hua Li, Lindon, UT (US)

(73) Assignee: Moxtek, Inc., Orem, UT (US)

( * ) Notice: Subject to any disclaimer, the term of this patent is extended or adjusted under 35 U.S.C. 154(b) by 29 days.

(21) Appl. No.: 15/357,356

(22) Filed: Nov. 21, 2016

(65) Prior Publication Data
US 2017/0068103 A1 Mar. 9, 2017

Related U.S. Application Data

(63) Continuation-in-part of application No. 14/699,803, filed on Apr. 29, 2015, now Pat. No. 9,726,897.
(Continued)

(51) Int. Cl.
*G02B 5/04* (2006.01)
*G02B 27/28* (2006.01)
(Continued)

(52) U.S. Cl.
CPC .......... *G02B 27/283* (2013.01); *G02B 5/04* (2013.01); *G02B 5/3058* (2013.01); *G02F 2001/133548* (2013.01)

(58) Field of Classification Search
CPC .. G02B 5/3025; G02B 27/283; G02B 5/3058; G02B 5/04; B82Y 20/00; G02F 2001/133548
(Continued)

(56) References Cited

U.S. PATENT DOCUMENTS 6,212,014 B1  4/2001 Lehman, Jr. et al.
6,288,840 B1  9/2001 Perkins et al.
(Continued)

FOREIGN PATENT DOCUMENTS

WO  WO 2015/183471  12/2015

OTHER PUBLICATIONS

Creath et al; "Dynamic quantitative phase imaging for biological objects using a pixelated phase mask"; Biomedical Optics Express; Oct. 2012; pp. 2866-2880.*
(Continued)

*Primary Examiner* — William R Alexander
*Assistant Examiner* — Henry A Duong
(74) *Attorney, Agent, or Firm* — Thorpe, North & Western, LLP

(57) ABSTRACT

Cube polarizers can be designed for substantially equal optical path lengths of a reflected beam and a transmitted beam. For example, $d_{11}$ of FIG. 1 can define a distance between a plane (face plane$_2$) of the outer face (outer face$_2$) of a second prism 16 and the first edge (first edge$_1$) of the first prism, and $d_{11}$ can be less than 400 micrometers. As another example, an optical path length differential between a transmitted beam and a reflected beam ($|OPL_T - OPL_R|$) can be $$< \frac{0.5 * t * n_p}{\sqrt{2}};$$

where t is a thickness of the substrate between the first surface and the second surface of the substrate and $n_p$ is an index of refraction of the first prism.

20 Claims, 10 Drawing Sheets

Related U.S. Application Data

(60) Provisional application No. 62/004,010, filed on May 28, 2014.

(51) Int. Cl.
   *G02B 5/30* (2006.01)
   *G02F 1/1335* (2006.01)

(58) Field of Classification Search
   USPC .................................................. 359/485.05
   See application file for complete search history.

(56) References Cited

U.S. PATENT DOCUMENTS

| | | | |
|---|---|---|---|
| 6,680,794 B2* | 1/2004 | McClay | G02B 1/02 359/355 |
| 7,085,050 B2 | 8/2006 | Florence | |
| 7,560,199 B2 | 7/2009 | Tan et al. | |
| 7,570,424 B2 | 8/2009 | Perkins et al. | |
| 7,813,039 B2* | 10/2010 | Perkins | G02B 5/3058 359/485.05 |
| 8,467,128 B2 | 6/2013 | Huang | |
| 2003/0076502 A1 | 4/2003 | Verma et al. | |
| 2004/0120041 A1 | 6/2004 | Silverstein et al. | |
| 2006/0001837 A1 | 1/2006 | Ho | |
| 2006/0119937 A1* | 6/2006 | Perkins | G02B 5/3058 359/485.03 |
| 2007/0297052 A1 | 12/2007 | Wong et al. | |
| 2008/0278811 A1* | 11/2008 | Perkins | G02B 5/3058 359/485.05 |
| 2008/0286455 A1 | 11/2008 | Hamamoto | |
| 2010/0128347 A1* | 5/2010 | Huang | G02B 5/3058 359/485.06 |
| 2010/0157420 A1 | 6/2010 | Shin | |
| 2012/0176676 A1* | 7/2012 | Sakamoto | G02B 5/3058 359/485.05 |
| 2012/0257168 A1 | 10/2012 | Ishimatsu | |
| 2013/0038933 A1 | 2/2013 | Wang et al. | |
| 2013/0258471 A1 | 10/2013 | Davis | |
| 2015/0268176 A1 | 9/2015 | Deng et al. | |

OTHER PUBLICATIONS

Kang et al.; "Enhanced deep ultraviolet inverse polarization transmission through hybrid Al-SiO$^2$ gratings"; Applied Physics Letters; 2013; 5 pages; vol. 103, 131110; American Institute of Physics; http://dx.doi.org/10.1063/1.4823537.

Baur; "A New Type of Beam Splitting Polarizer Cube," Meadowlark Optics (2005), pp. 1-9.

\* cited by examiner

CUBE POLARIZER

PRIORITY CLAIM

This application is a continuation-in-part of U.S. patent application Ser. No. 14/699,803, filed on Apr. 29, 2015, which claims priority to U.S. Provisional Patent Application No. 62/004,010, filed May 28, 2014, which are hereby incorporated herein by reference in their entirety.

FIELD OF THE INVENTION

The present application is related generally to polarizing beam splitters, especially wire grid polarizers disposed inside of a cube.

BACKGROUND

Wire grid polarizers can be fastened inside of a cube. A cube polarizer can be better than a plate polarizer to (1) reduce astigmatism; (2) provide a mechanical structure, which can allow attachment of other devices (e.g. other polarizers or an LCOS imager); and (3) reduce wavefront distortion.

As shown in FIG. 13, a cube polarizer 130 can include a wire grid polarizer 131 sandwiched between two prisms—prism$_A$ 135 and prism$_B$ 136. The wire grid polarizer 131 can include wires 131$_w$ disposed over a substrate 131$_s$. In one example of a cube polarizer, the cube can be 10 millimeters (mm) wide, the substrate 131$_s$ can be 0.7 mm thick, and the wires 131$_w$ can be about 0.0003 mm thick. Thus, in order to show all components of the cube polarizer 130, the drawings have not been drawn to scale.

An unpolarized light beam U can enter one side (outer face$_A$) of prism$_A$ 135 and can be polarized into a reflected beam R and a transmitted beam T. The reflected beam R can reflect off the wires 131$_w$ of the wire grid polarizer 131, continue through prism$_A$ 135, and exit through another side (outer side$_A$) of prism$_A$ 135. The transmitted beam T can transmit through the polarizer 131 and prism$_B$ 136, and exit through a side (outer face$_B$) of prism$_B$ 136.

The reflected beam R has an optical path length OPL$_R$ and the transmitted beam T has an optical path length OPL$_T$. The optical path length OPL is defined as the actual physical distance the light travels through the cube polarizer times an index of refraction n of the material(s) through which the light travels.

In some cube polarizer designs, there is a substantial difference in optical path length between the reflected and transmitted beams due to a thickness t of the substrate 131$_s$ (see FIGS. 13 and 14). For example, both prisms 135 and 136 can have the same size, and can be combined such that edges 137 of the prisms 135 and 136 align with edges of the wire grid polarizer 131. The wire grid polarizer 131 can be disposed at a 45° angle between the prisms 135 and 136, such that light entering perpendicularly to the outer face$_A$ will meet the wire grid polarizer 131 at a 45° angle. The wire grid polarizer 131 can have wires 131$_w$ on one face of the wire grid polarizer 131. This cube may be physically symmetric based on outer dimensions, but not optically symmetrical due to the effect of the thickness t of the substrate 131$_s$. Following are calculations showing this lack of optical symmetry. See reference variables in FIGS. 13 and 14 and definitions below. Note that FIG. 14 shows only the substrate 131$_s$ of the wire grid polarizer 131 without the wires 131$_w$.

$$d_4^2 = t^2 + t^2 \cdot d_4 = \sqrt{2} * t. \qquad 1.$$

$$OPL_R = d_1 * n_p + d_3 * n_p - \frac{d_4 * n_p}{2}. \qquad 2.$$

$$OPL_R = d_1 * n_p + d_2 * n_p - \frac{t * n_p}{\sqrt{2}}. \qquad 3.$$

$$(d_2 = d_3 \text{ and } d_4 = \sqrt{2} * t)$$

$$OPL_T = d_1 * n_p + d_2 * n_p - \sqrt{2} * t * n_p + \sqrt{2} * t * n_s. \qquad 4.$$

$$\Delta OPL = |OPL_T - OPL_R| = \qquad 5.$$

$$-\sqrt{2} * t * n_p + \sqrt{2} * t * n_s + \frac{t * n_p}{\sqrt{2}} = \frac{t * (2 * n_s - n_p)}{\sqrt{2}}.$$

$$\text{If } n_s = n_p, \text{ then } \Delta OPL = \frac{t * n_p}{\sqrt{2}}. \qquad 6.$$

Reference Variable Definitions:
- d$_1$ is a distance from the outer face$_A$ to a center of the polarizer 131.
- d$_2$ is a distance from the outer face$_B$ to a center of the polarizer 131.
- d$_3$ is a distance from where the light is polarized to the outer side$_A$. Due to structural symmetry of the cube, d$_2$ can equal d$_3$.
- d$_4$ is a distance of travel of the transmitted beam 104 through the polarizer 131.
- n$_p$ is an index of refraction of the prisms (assuming both prisms have the same index).
- n$_s$ is an index of refraction of the substrate. Any thin films on the substrate 131$_s$ are ignored as they are negligible relative to a thickness of the substrate 131$_s$.
- t is a thickness of the substrate. t is also a third leg of a triangle formed by d$_4$ and t for a light beam U meeting the polarizer at a 45° angle.
- ΔOPL is an absolute difference in optical path length between the transmitted beam T and the reflected beam R.

This difference in optical path length $$\Delta OPL = \frac{t * n_p}{\sqrt{2}}$$

can cause problems in some applications. Methods have been proposed to solve such problems, some of which may be impractical due to high manufacturing cost.

Curvature of a wire grid polarizer 131 in a cube can cause problems. The wire grid polarizer can curve due to stresses induced by the wires or other thin films adjacent to the wires. This curvature can result in a reflected light beam reflected off of one region of the polarizer having a different optical path length than a reflected light beam reflected off of another region of the polarizer, thus causing wavefront distortion. There can be a similar problem with the transmitted beam.

Information relevant to wire grid polarizers and polarizing cubes can be found in U.S. Pat. Nos. 8,467,128; 7,570,424; 7,085,050; 6,288,840; U.S. Patent Publication Number 2007/0297052; and in the publication "A new type of beam splitting polarizer cube," Meadowlark Optics, Thomas Baur, 2005, pages 1-9.

SUMMARY

It has been recognized that it would be advantageous to have a cube polarizer with minimal difference in optical path length between reflected and transmitted beams. The present invention is directed to various embodiments of cube polarizers that satisfy this need.

The cube polarizer can comprise a first prism and a second prism. The first prism can include two triangular faces linked by an inner face, an outer face, and an outer side; a junction of the inner face of the first prism and the outer side of the first prism defining a first edge of the first prism; a junction of the outer face of the first prism and the outer side of the first prism defining a second edge of the first prism; a junction of the inner face of the first prism and the outer face of the first prism defining a third edge of the first prism; and a distance from the first edge of the first prism to the second edge of the first prism defining $L_{OS1}$. The second prism can include two triangular faces linked by an inner face, an outer face, and an outer side; a junction of the inner face of the second prism and the outer side of the second prism defining a first edge of the second prism; a junction of the outer face of the second prism and the outer side of the second prism defining a second edge of the second prism; a junction of the inner face of the second prism and the outer face of the second prism defining a third edge of the second prism; and a distance from the first edge of the second prism to the second edge of the second prism defining $L_{OS2}$.

The cube polarizer can also comprise a wire grid polarizer. The wire grid polarizer can include a substrate with a first surface and an opposite second surface substantially parallel to the first surface and an array of parallel, elongated, separated wires disposed over the first surface of the substrate. The wire grid polarizer can be sandwiched between the first prism and the second prism such that: the second surface of the substrate is attached to and faces the inner face of the second prism; the wires are attached to and face the inner face of the first prism; the outer face of the first prism is opposite to the outer face of the second prism; and the outer side of the first prism is opposite to the outer side of the second prism.

In one embodiment, $L_{OS1} > L_{OS2}$. In another embodiment, $d_{11}$ can define a distance between a plane of the outer face of the second prism and the first edge of the first prism. $d_{11}$ can be less than 400 micrometers.

In another embodiment, a beam of light entering through the outer face of the first prism can be polarized at the wire grid polarizer, forming a transmitted beam of light transmitting through the wire grid polarizer and exiting through the outer face of the second prism and a reflected beam of light reflecting off of the wire grid polarizer and exiting through the outer side of the first prism. The cube polarizer can satisfy the equation:

$$|OPL_T - OPL_R| < \frac{0.5 * t * n_p}{\sqrt{2}};$$

where: an optical path length is a distance of light travel through a material times an index of refraction of the material; $OPL_T$ is an optical path length of the transmitted beam; $OPL_R$ is an optical path length of the reflected beam; t is a thickness of the substrate between the first surface and the second surface of the substrate; and $n_P$ is an index of refraction of the first prism.

DEFINITIONS

As used herein, "cube" means a solid that is bounded by six faces. Each face need not be square, rectangle, or parallelogram. At least one of the faces can have a curved surface, such as a parabolic shape for example.

As used herein, the term "light" can mean light or electromagnetic radiation in the x-ray, ultraviolet, visible, and/or infrared, or other regions of the electromagnetic spectrum.

As used herein "thin film" means a substantially continuous or unbroken film of material having a thickness not larger than three times a maximum wavelength in the light spectrum of interest. "Substantially continuous" in this definition means that there may be some discontinuity, such as pinholes, but no major discontinuity, such as a division into a grid or separate wires.

DETAILED DESCRIPTION

Various cube polarizer and wire grid polarizer designs will be described and shown in the figures. These cube polarizers and wire grid polarizers are not necessarily drawn to scale. Due to a relatively large size of prisms of the cubes, smaller size of wire grid polarizer substrates, and very small size of wires or thin films, it would be impractical to draw to scale. Some dimensions of these components are specified below and others are known in the art.

Figure 1:
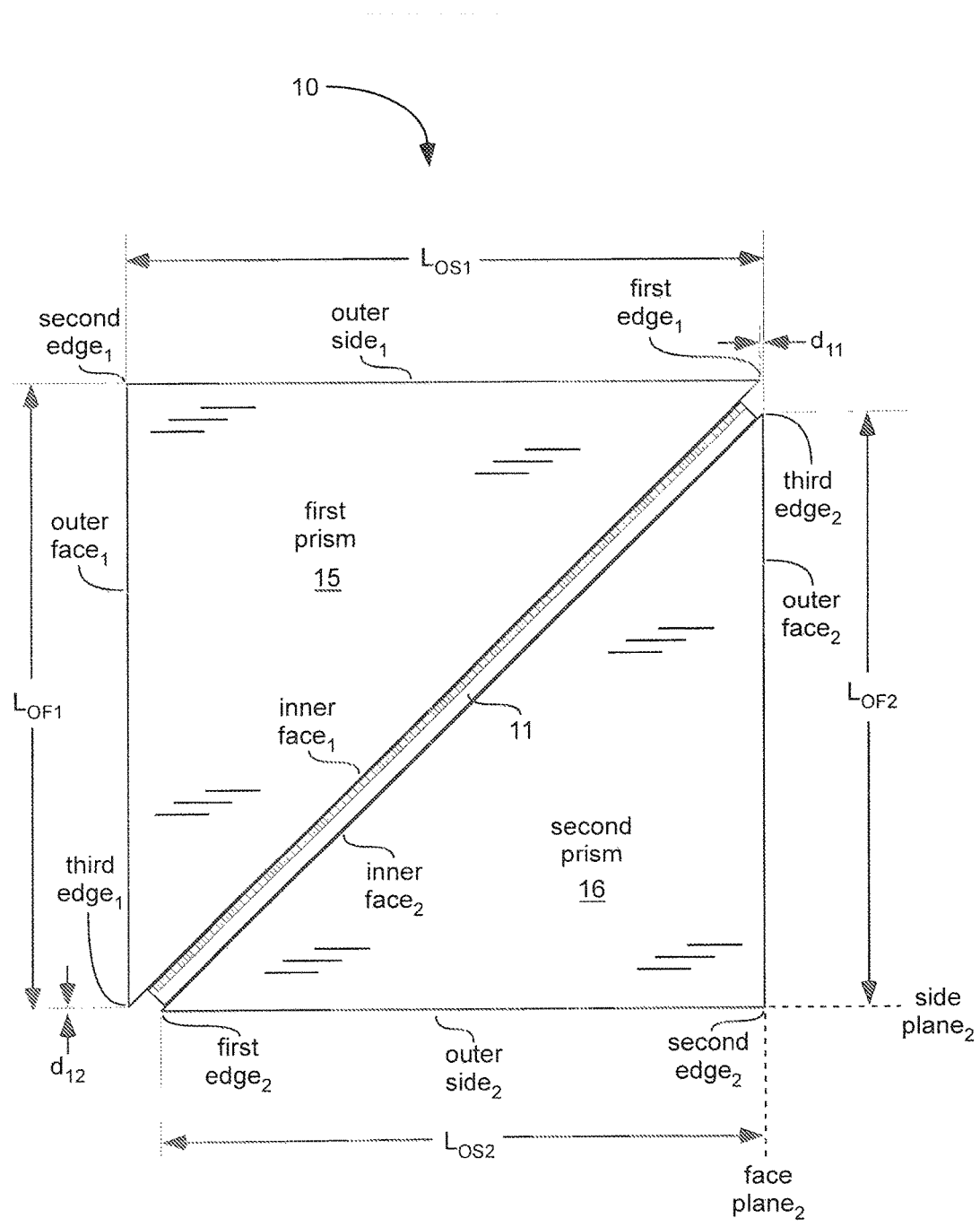
FIG. 1 is a schematic side view of a cube polarizer, with a closely aligned first edge and face plane$_2$, in accordance with an embodiment of the present invention.
Figure 2:
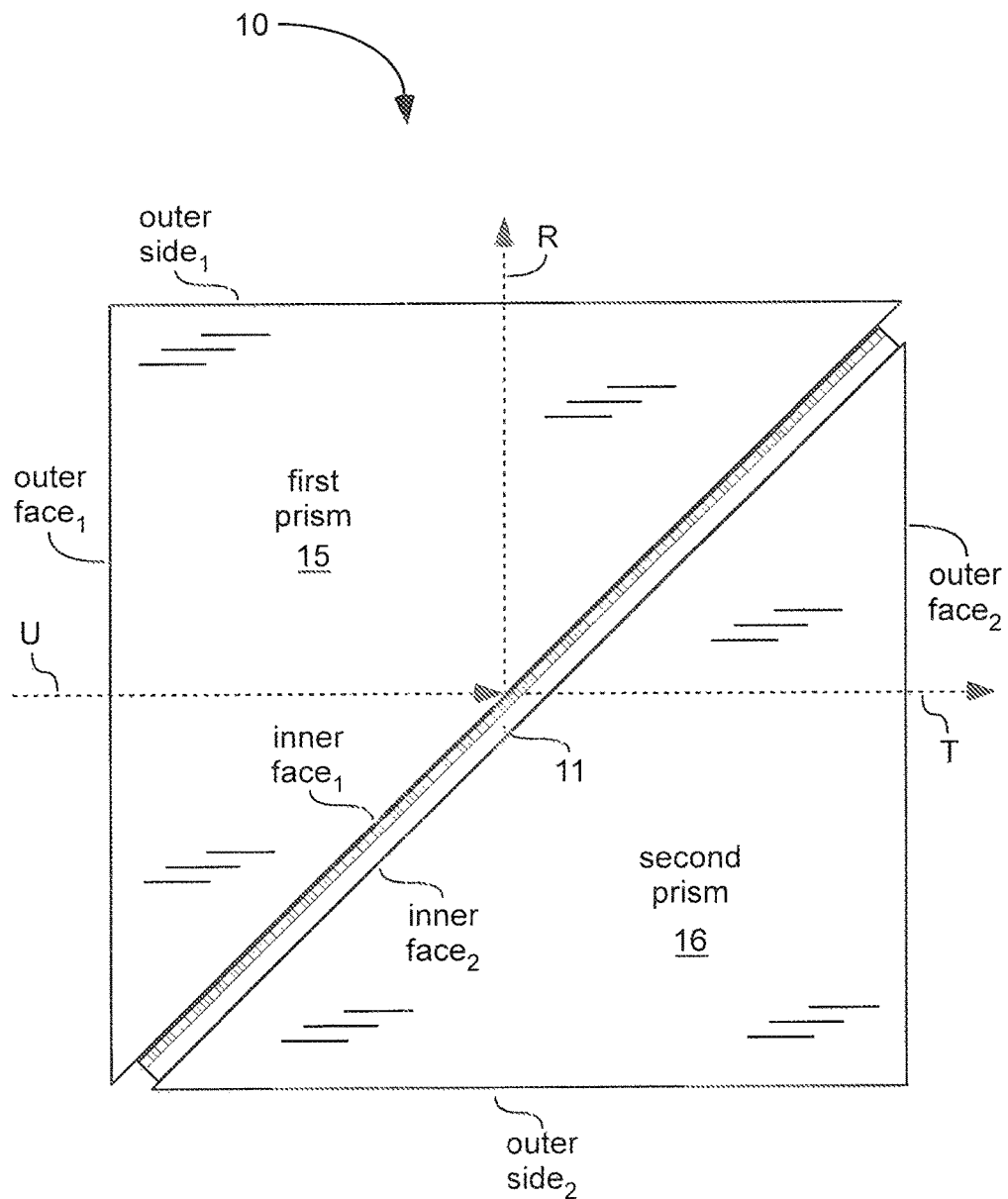
FIG. 2 is a schematic side view of the cube polarizer of FIG. 1, showing an unpolarized beam, a reflected beam, and a transmitted beam, in accordance with an embodiment of the present invention.

As illustrated in FIGS. 1 and 2, a cube polarizer 10 is shown comprising a first prism 15 and a second prism 16. This cube polarizer 10 can be designed for equal, or nearly equal, optical path lengths of a reflected beam R and a transmitted beam T of light. It has been recognized that it can be important to keep these two optical path lengths as close to equal as possible. Examples of applications which require equal (or near equal) optical path lengths are interferometry and 3D projection displays.

The first prism 15 can include two triangular faces linked by an inner face (inner face$_1$), an outer face (outer face$_1$), and an outer side (outer side$_1$). A junction of the inner face$_1$ and the outer side$_1$ defines a first edge (first edge$_1$). A junction of the outer face$_1$ and the outer side$_1$ defines a second edge (second edge$_1$). A junction of the inner face$_1$ and the outer face$_1$ defines a third edge (third edge$_1$). A distance from the first edge$_1$ to the second edge$_1$ defines an outer side length ($L_{OS1}$). A distance from the second edge$_1$ to the third edge$_1$ defines an outer face length$_1$ ($L_{OF1}$).

The second prism 16 can include two triangular faces linked by an inner face (inner face$_2$), an outer face (outer face$_2$), and an outer side (outer side$_2$). A junction of the inner face$_2$ and the outer side$_2$ defines a first edge (first edge$_2$). A junction of the outer face$_2$ and the outer side$_2$ defines a second edge (second edge$_2$). A junction of the inner face$_2$ and the outer face$_2$ defines a third edge (third edge$_2$). A distance from the first edge$_2$ to the second edge$_2$ defines an outer side length$_2$ ($L_{OS2}$). A distance from the second edge$_2$ to the third edge$_2$ defines an outer face length$_2$ ($L_{OF2}$).

The cube polarizer 10 can include a wire grid polarizer 11. The wire grid polarizer can be any wire grid polarizer or can be made according to one of the various embodiments of wire grid polarizers 90, 41, 110, and 120 shown in FIGS. 9-12. The wire grid polarizer 11 can include a substrate 92 having a first surface 92$_f$ and an opposite second surface 92$_s$ substantially parallel to the first surface 92$_f$. An array of parallel, elongated, separated wires 91 (separated by gaps G) can be disposed over the first surface 92$_f$ of the substrate 92. The wire grid polarizer 11 can be sandwiched between the first prism 15 and the second prism 16 such that: (1) the second surface 92$_s$ of the substrate 92 is attached to and faces the inner face$_2$ (or the inner face$_1$); (2) the wires 91 are attached to and face the inner face$_1$ (or the inner face$_2$); (3) the outer face$_1$ is opposite to the outer face$_2$; (4) and the outer side is opposite to the outer side$_2$.

An unpolarized light beam U can enter through the outer face$_1$. The unpolarized light beam U can be polarized at the wire grid polarizer 11, forming (1) a transmitted beam T of light transmitting through the wire grid polarizer 11 and exiting through the outer face$_2$; and (2) a reflected beam R of light reflecting off of the wire grid polarizer 11 and exiting through the outer side$_1$. The cube polarizer 10 can be designed for equal, or nearly equal, optical path lengths of the reflected beam R and the transmitted beam T. Optical path length is a distance of light travel through a material times an index of refraction of the material.

One way of equalizing, or nearly equalizing, the optical path lengths of the reflected beam R and the transmitted beam T is to align a plane (face plane$_2$) of the outer face$_2$ with the first edge$_1$. Exact alignment can be optimal, but considerable benefit can be gained by substantial alignment. Imperfections in manufacturing may make exact alignment too difficult. This alignment can be quantified by a distance $d_{11}$ between the face plane$_2$ and the first edge$_1$. For exact alignment, $d_{11}=0$. Substantial alignment can be $d_{11}<500$ micrometers in one aspect, $d_{11}<450$ micrometers in another aspect, $d_{11}<400$ micrometers in another aspect, $d_{11}<250$ micrometers in another aspect, $d_{11}<100$ micrometers in another aspect, or $d_{11}<10$ micrometers in another aspect. Such alignment can equalize, or nearly equalize, optical path lengths of the reflected beam R and the transmitted beam T.

This alignment can be done by shifting the second prism 16 down and to the left (based on view of FIGS. 1-2) or by decreasing $L_{OS2}$ relative to $L_{OS1}$ ($L_{OS1}>L_{OS2}$), which can be done by starting with different sized prisms 15 and 16 or by machining down the second prism 16 after assembly.

Examples of possible relationships between $L_{OS1}$ and $L_{OS2}$ include: $L_{OS1}-L_{OS2}>1$ micrometer, $L_{OS1}-L_{OS2}>10$ micrometers, $L_{OS1}-L_{OS2}>50$ micrometers, $L_{OS1}-L_{OS2}>100$ micrometers, $L_{OS1}-L_{OS2}>500$ micrometer, $L_{OS1}-L_{OS2}<250$ micrometers, $L_{OS1}-L_{OS2}<500$ micrometers, $L_{OS1}-L_{OS2}<600$ micrometers, $L_{OS1}-L_{OS2}<750$ micrometers, $L_{OS1}-L_{OS2}<1000$ micrometers. The actual desired difference between $L_{OS1}$ and $L_{OS2}$ can depend on a thickness t of the substrate 92.

In some designs, it can be desirable to have $L_{OS1}>L_{OS2}$ and $L_{OF1}>L_{OF2}$. Having $L_{OS1}>L_{OS2}$ and $L_{OF1}>L_{OF2}$ may be desirable to form a square end of the cube polarizer 10 where the triangular faces of the prisms 15 and 16 join, to allow the cube polarizer 10 to fit into a structure where the cube polarizer 10 will be used, or to avoid an edge of a prism sticking out beyond the rest of the cube where it could be damaged. Having $L_{OS1}>L_{OS2}$ and $L_{OF1}>L_{OF2}$ may be desirable if the cube polarizer 10 is designed to allow unpolarized light to enter through the outer side$_1$ and it is important for reflected and transmitted beams from this light to also have equal, or nearly equal optical path lengths.

Thus, in addition to aligning the face plane$_2$ with the first edge$_1$, a plane (side plane$_2$) of the outer side$_2$ can be substantially aligned with the third edge$_1$, thus minimizing a distance $d_{12}$ between the side plane$_2$ and the third edge$_1$. $d_{12}$ can be less than 500 micrometers in one aspect, less than 450 micrometers in another aspect, less than 400 micrometers in another aspect, less than 250 micrometers in another aspect, less than 100 micrometers in another aspect, or less than 10 micrometers in another aspect.

Examples of possible relationships between $L_{OF1}$ and $L_{OF2}$ include: $L_{OF1}-L_{OF2}>1$ micrometer, $L_{OF1}-L_{OF2}>10$ micrometers, $L_{OF1}-L_{OF2}>50$ micrometers, $L_{OF1}-L_{OF2}>100$ micrometers, $L_{OF1}-L_{OF2}>500$ micrometer, $L_{OF1}-L_{OF2}<250$ micrometers, $L_{OF1}-L_{OF2}<500$ micrometers, $L_{OF1}-L_{OF2}<600$ micrometers, $L_{OF1}-L_{OF2}<750$ micrometers, $L_{OF1}-L_{OF2}<1000$ micrometers. The actual desired difference between $L_{OF1}$ and $L_{OF2}$ can depend on a thickness t of the substrate 92.

By minimizing the distances $d_{11}$ and/or $d_{12}$, optical path lengths of the reflected beam R and the transmitted beam T can be equal or substantially equal. Thus, the cube polarizer 10 can satisfy the equation $$|OPL_T - OPL_R| < \frac{0.5 * t * n_p}{\sqrt{2}}$$

in one aspect, can satisfy the equation $$|OPL_T - OPL_R| < \frac{0.1 * t * n_p}{\sqrt{2}}$$

in another aspect, can satisfy the equation $$|OPL_T - OPL_R| < \frac{0.01 * t * n_p}{\sqrt{2}}$$

in another aspect, or can satisfy the equation $$|OPL_T - OPL_R| < \frac{0.001 * t * n_p}{\sqrt{2}}$$

in another aspect, wherein:
OPL$_T$ is an optical path length of the transmitted beam T;
OPL$_R$ is an optical path length of the reflected beam R;
t is a thickness of the substrate 92 between the first surface 92$_f$ and the second surface 92$_s$; and
n$_P$ is an index of refraction of the first prism 15.

|OPL$_T$–OPL$_R$| can be less than 500 micrometers in one aspect, less than 100 micrometers in another aspect, less than 10 micrometers in another aspect, or less than 1 micrometer in another aspect.

Figure 3:
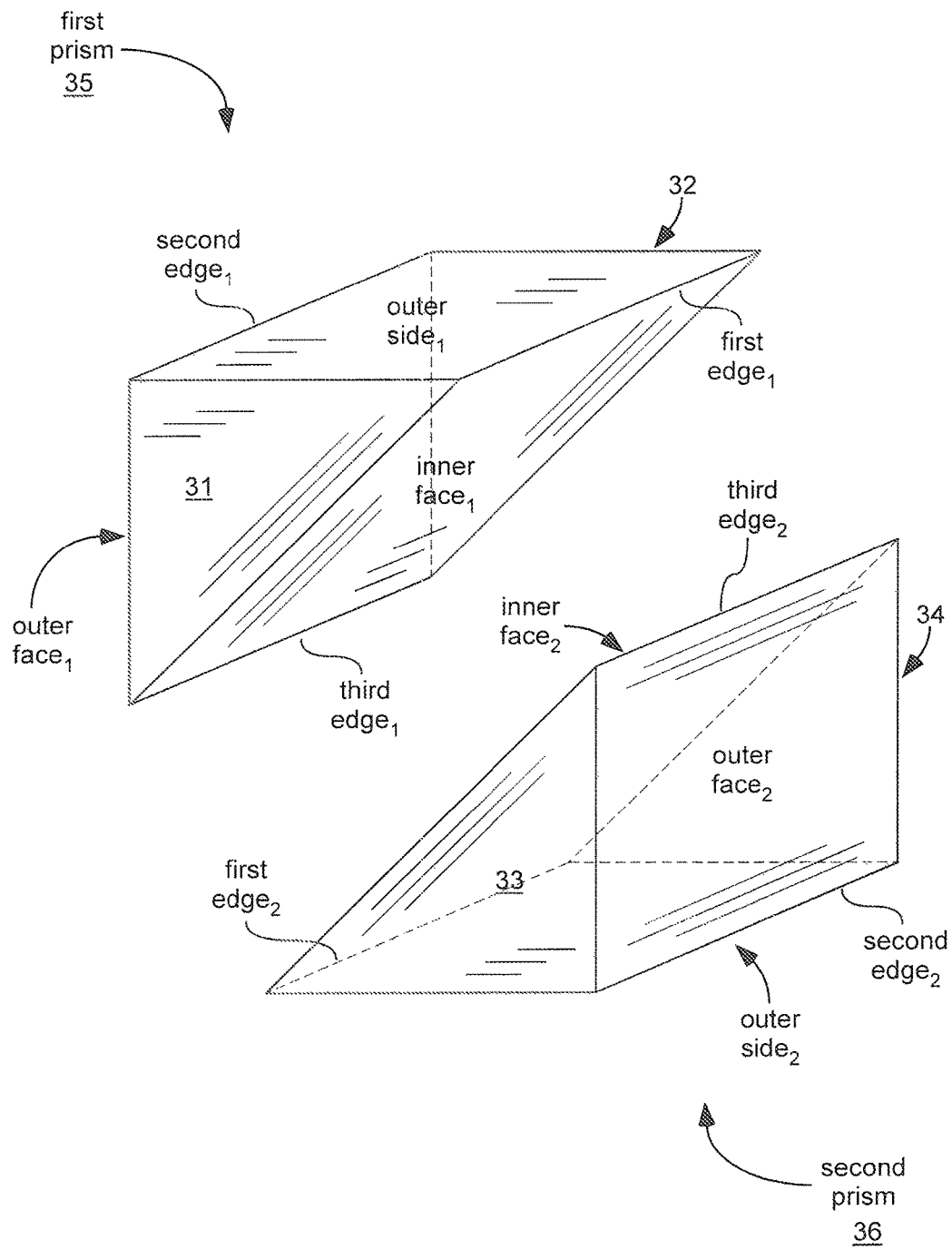
FIG. 3 is a schematic perspective view of a first prism and a second prism of the cube polarizer of FIG. 1.
Figure 4:
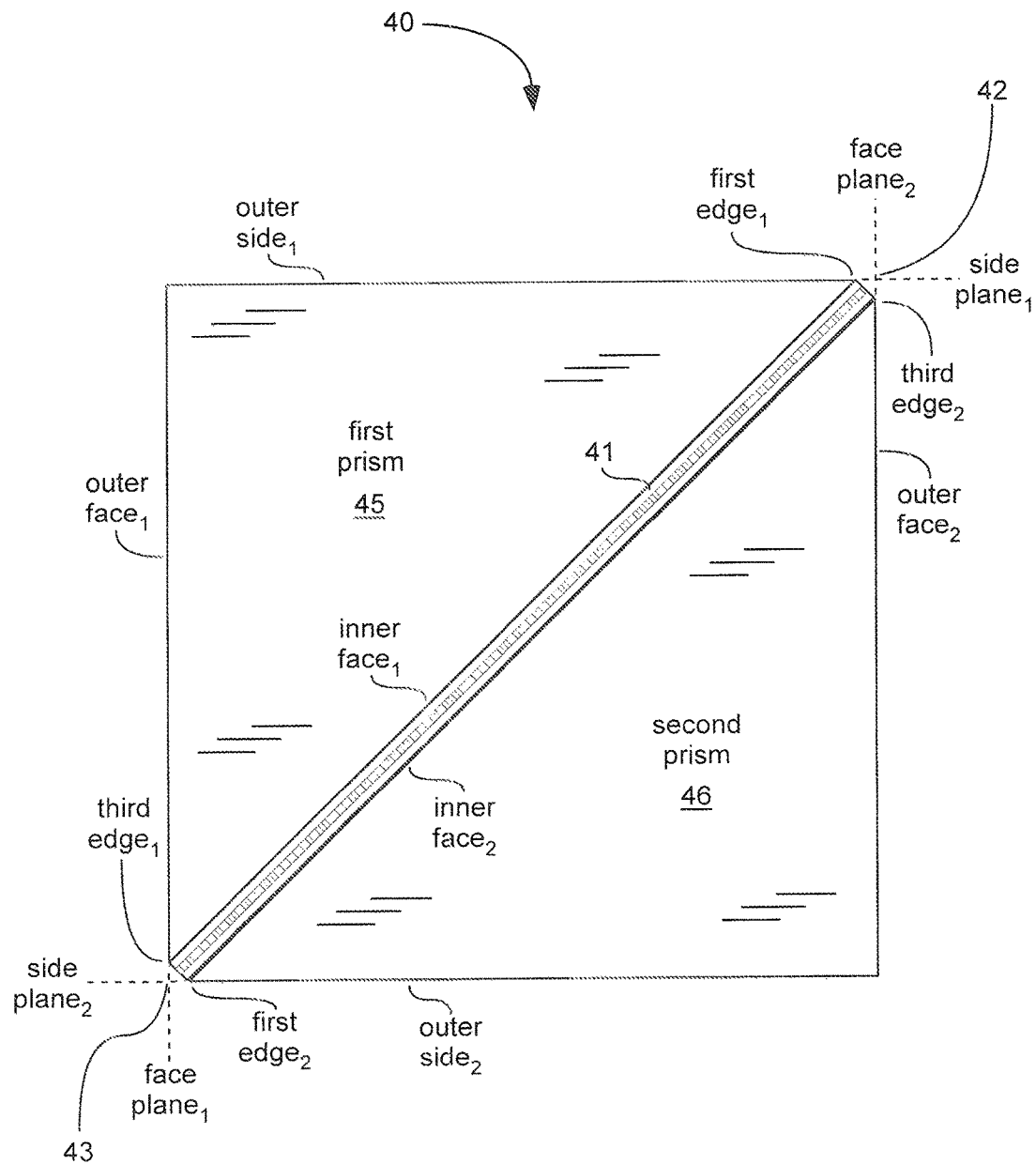
FIG. 4 is a schematic side view of a cube polarizer, including a wire grid polarizer with wires sandwiched between a first substrate and a second substrate, in accordance with an embodiment of the present invention.

Illustrated in FIG. 3 are a first prism 35 and a second prism 36 in schematic perspective view, to more clearly show the sides, faces, and edges of the prisms. The first prism 35 can include two triangular faces 31 and 32 linked by an inner face (inner face$_1$), an outer face (outer face$_1$), and an outer side (outer side$_1$). The second prism 36 can include two triangular faces 33 and 34 linked by an inner face (inner face$_2$), an outer face (outer face$_2$), and an outer side (outer side$_2$). These prisms 35 and 36 are applicable to all embodiments described herein.

Illustrated in FIGS. 4-7 is another embodiment of a cube polarizer 40. The cube polarizer 40 can include a wire grid polarizer 41 sandwiched between the inner faces of a first prism 45 and a second prism 46.

The first prism 45 can include two triangular faces linked by an inner face (inner face$_1$), an outer face (outer face$_1$), and an outer side (outer side$_1$). A junction of the inner face$_1$ and the outer side$_1$ defines a first edge (first edge$_1$). A junction of the inner face$_1$ and the outer face$_1$ defines a third edge (third edge$_1$).

The second prism 46 can include two triangular faces linked by an inner face (inner face$_2$), an outer face (outer face$_2$), and an outer side (outer side$_2$). A junction of the inner face$_2$ and the outer side$_2$ defines a first edge (first edge$_2$). A junction of the inner face$_2$ and the outer face$_2$ defines a third edge (third edge$_2$).

The cube polarizer 40 can be designed for equal, or nearly equal, optical path lengths of a reflected beam R and a transmitted beam T. Such equality of optical path lengths can be achieved by wire grid polarizer symmetry and prism symmetry.

Figure 10:
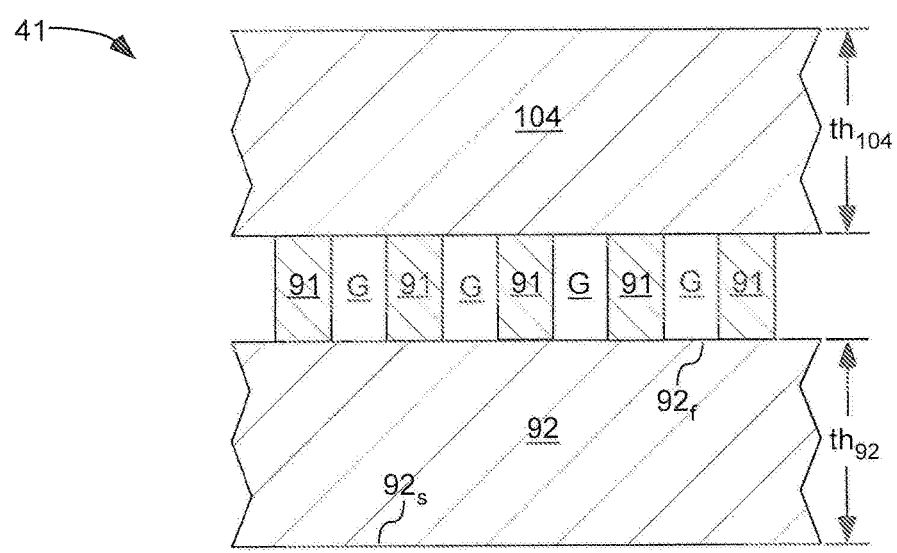
Figure 11:
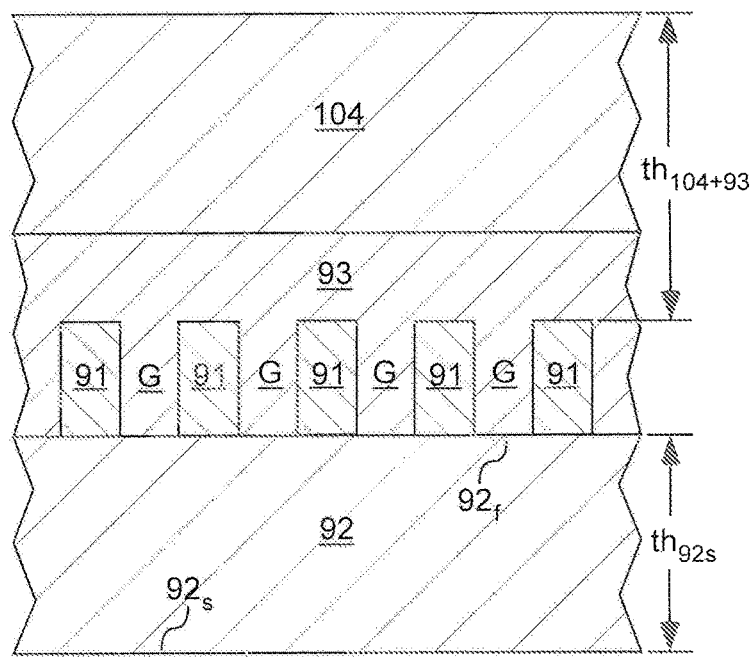

For wire grid polarizer symmetry, the wire grid polarizer 41 can include an array of parallel, elongated, separated wires 91 (separated by gaps G) sandwiched between a first substrate 92 and a second substrate 104, as shown in FIGS. 10-11. The wires 91 can be added to the first substrate 92 by standard thin film deposition and patterning techniques. The second substrate 104 can be attached on top of the wires 91 by an adhesive.

The substrates 92 and 104 can be thick in an optical sense (e.g. not thin films) in order to provide structural support for the wire grid polarizer 41. A thickness th$_{92}$ of the first substrate 92 and a thickness th$_{104}$ of the second substrate 104 can both be greater than 0.4 millimeters in one aspect, greater than 0.5 millimeters in another aspect, or between 0.4 and 1.4 millimeters in another aspect. For wire grid polarizer symmetry, the thickness th$_{92}$ of the first substrate 92 can equal or substantially equal the thickness th$_{104}$ of the second substrate 104.

Figure 9:
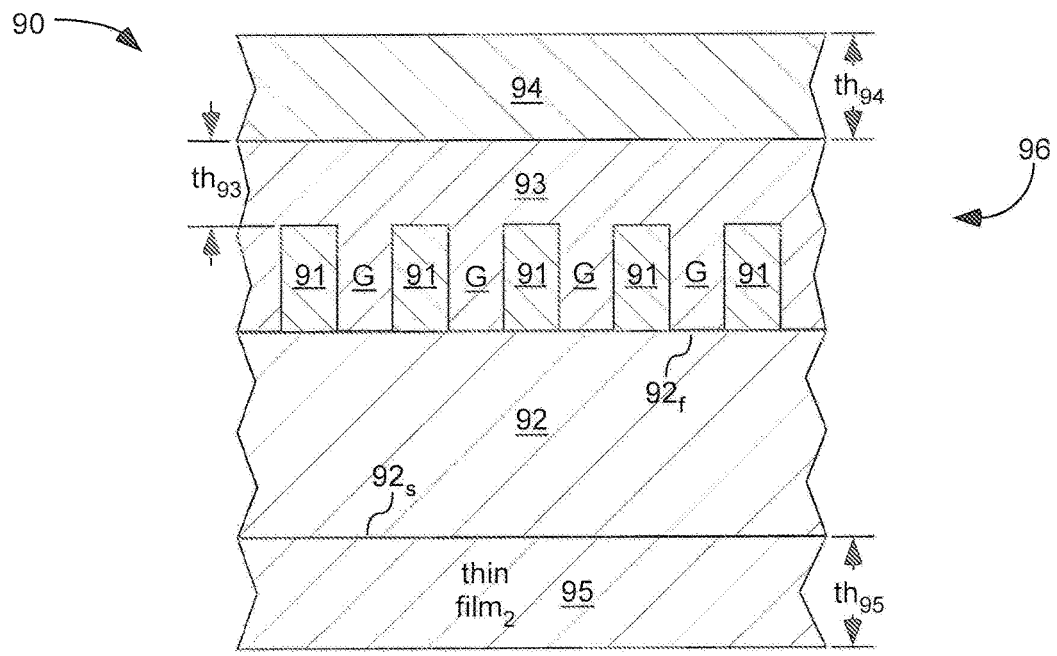
FIGS. 9-12 are schematic cross-sectional side views of portions of wire grid polarizers, in accordance with embodiments of the present invention.
Figure 12:
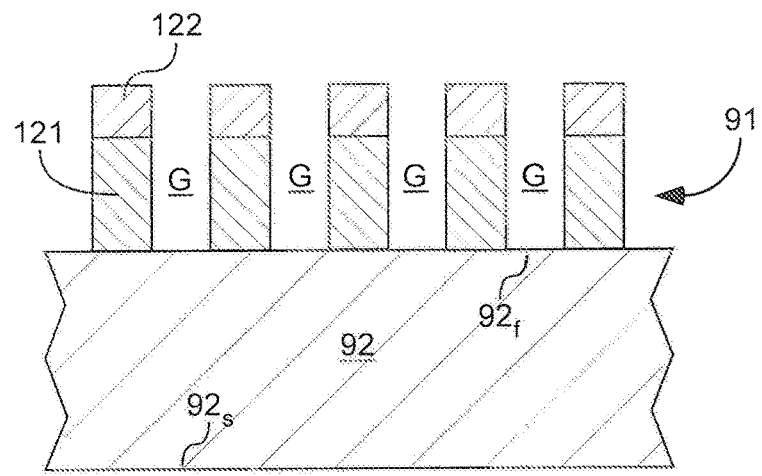
Figure 13:
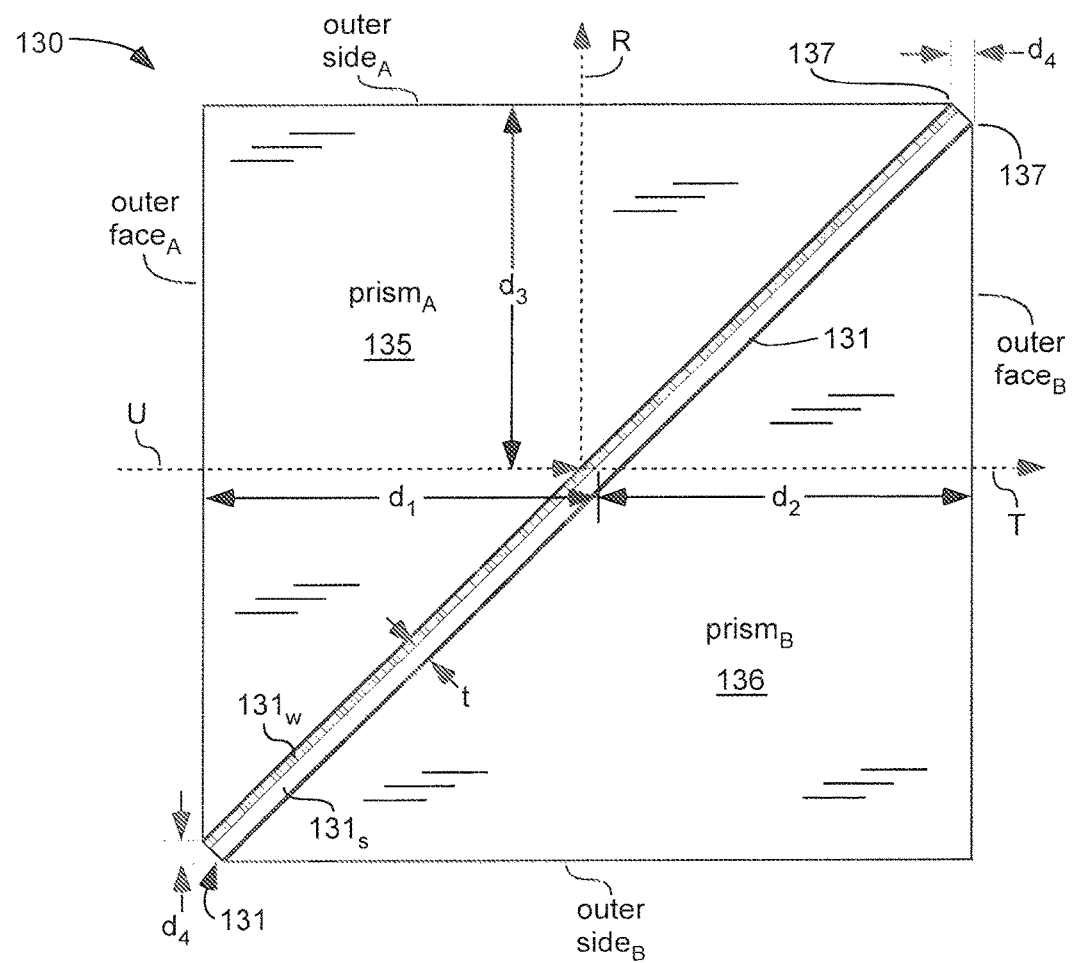
FIG. 13 is a schematic side view of a cube polarizer, in accordance with the prior art.
Figure 14:
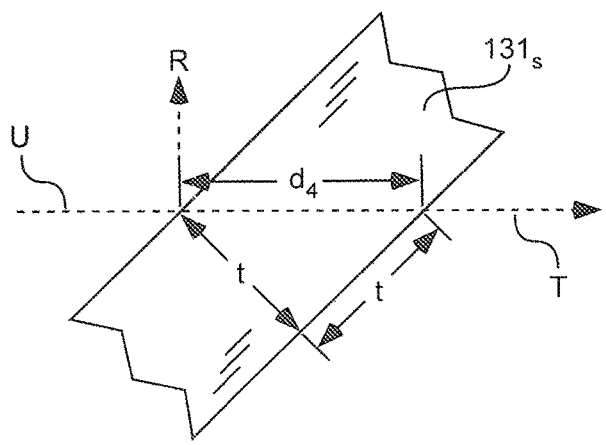
FIG. 14 is a schematic cross-sectional side view of a portion of a substrate of a wire grid polarizer, in accordance with the prior art.

A wire grid polarizer 110, as shown in FIG. 11, can be used in the cube polarizer 40 instead of wire grid polarizer 41. Wire grid polarizer 110 includes a first thin film 93, such as silicon dioxide for example, disposed above the wires 91. The first thin film 93 can also be disposed in and can substantially fill the gaps G between the wires. For symmetry, a thickness th$_{92}$ of the first substrate 92 can equal or substantially equal a combined thickness th$_{104+93}$ of the second substrate 104 and the first thin film 93 above the wires 91. Due to the small thickness of the first thin film 93, however, its thickness might be ignored, and a cube polarizer designer might only consider thicknesses th$_{92}$ and th$_{104}$ of the substrates 92 and 104. Wire grid polarizers 90 and 120, as shown in FIGS. 9 and 12, can also be used in cube polarizer 80, with the addition of a second substrate 104.

For prism symmetry, a size of the two triangular faces of the first prism 45 can equal or substantially equal a size of the two triangular faces of the second prism 46. For equal or substantially equal optical path lengths, the first prism 45 can be made of substantially the same material as the second prism 46. Alternatively, there can be differences of materials and index of refraction between the prisms, and such differences can be compensated for by differences in size between the prisms, but such a design can be complex. Symmetry of both material and size can be a simple way to obtain equivalent optical path lengths.

Figure 5:
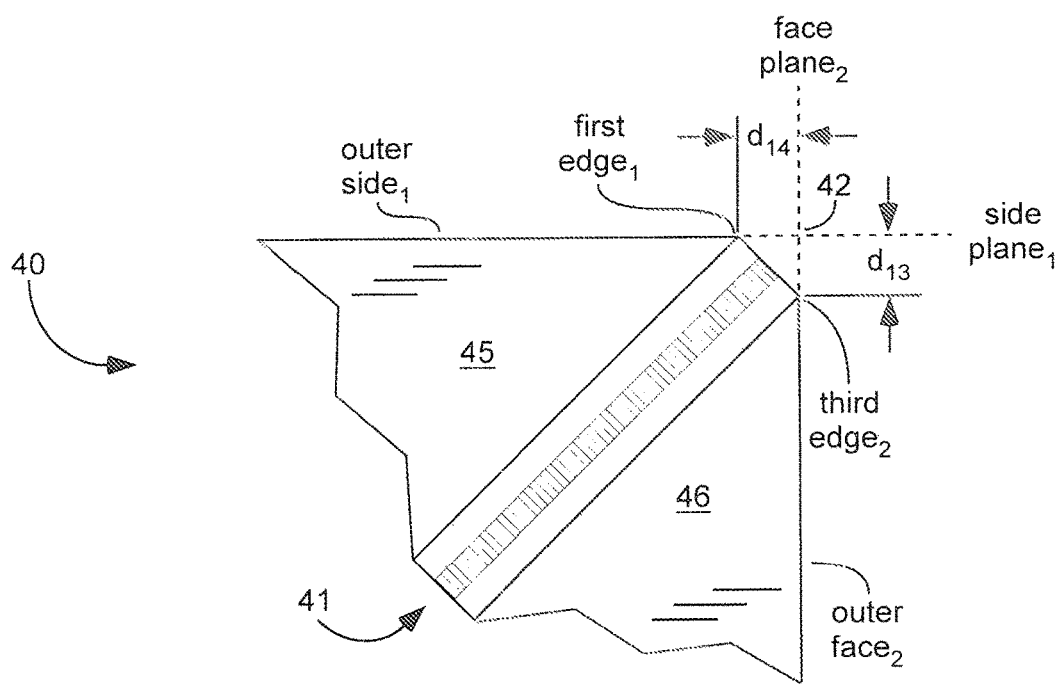
FIGS. 5-6 are detailed, schematic, side-views of corners of the cube polarizer of FIG. 4, in accordance with embodiments of the present invention.
Figure 6:
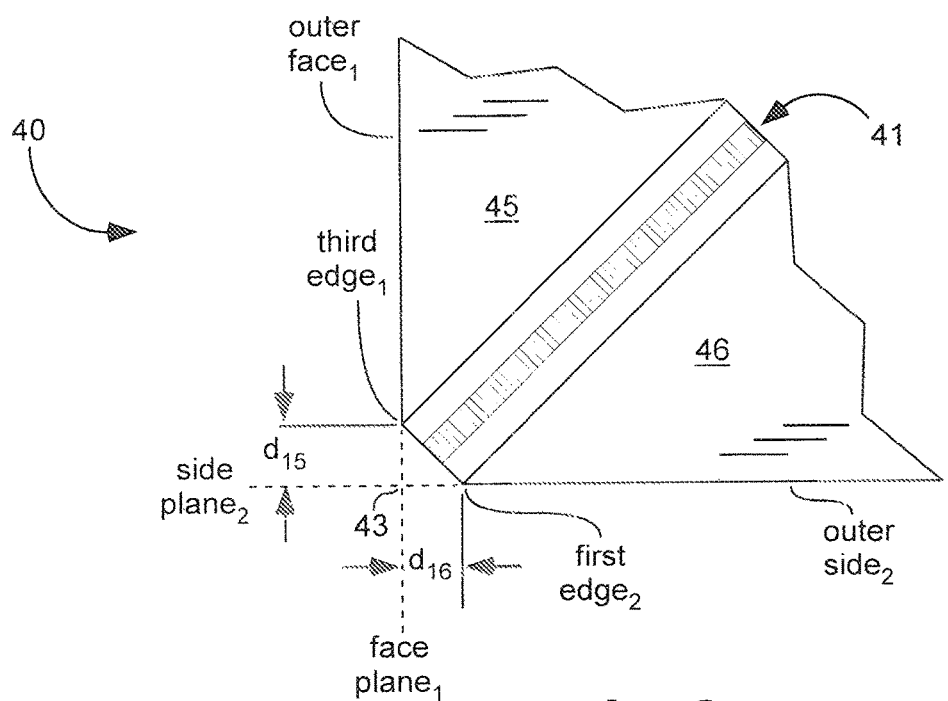

In addition to equal or similar prism 45 and 46 size and material, alignment of the prisms 45 and 46 can also be important for symmetry of the cube polarizer 40. The following description, and FIGS. 5 and 6, describe and show such alignment. As shown in FIG. 5, a plane of the outer face$_2$ (face plane$_2$) can cross perpendicularly a plane of the outer sides (side plane$_1$) at a first junction 42. A distance d$_{14}$ between the first edge$_2$ and the first junction 42 can equal, or substantially equal, a distance d$_{13}$ between the third edge$_2$ and the first junction 42. As shown in FIG. 6, a plane of the outer faces (face plane$_1$) can cross perpendicularly a plane of the outer side$_2$ (side plane$_2$) at a second junction 43. A distance d$_{16}$ between the first edge$_2$ and the second junction 43 can equal, or substantially equal, a distance d$_{15}$ between the third edge$_1$ and the second junction 43.

Figure 7:
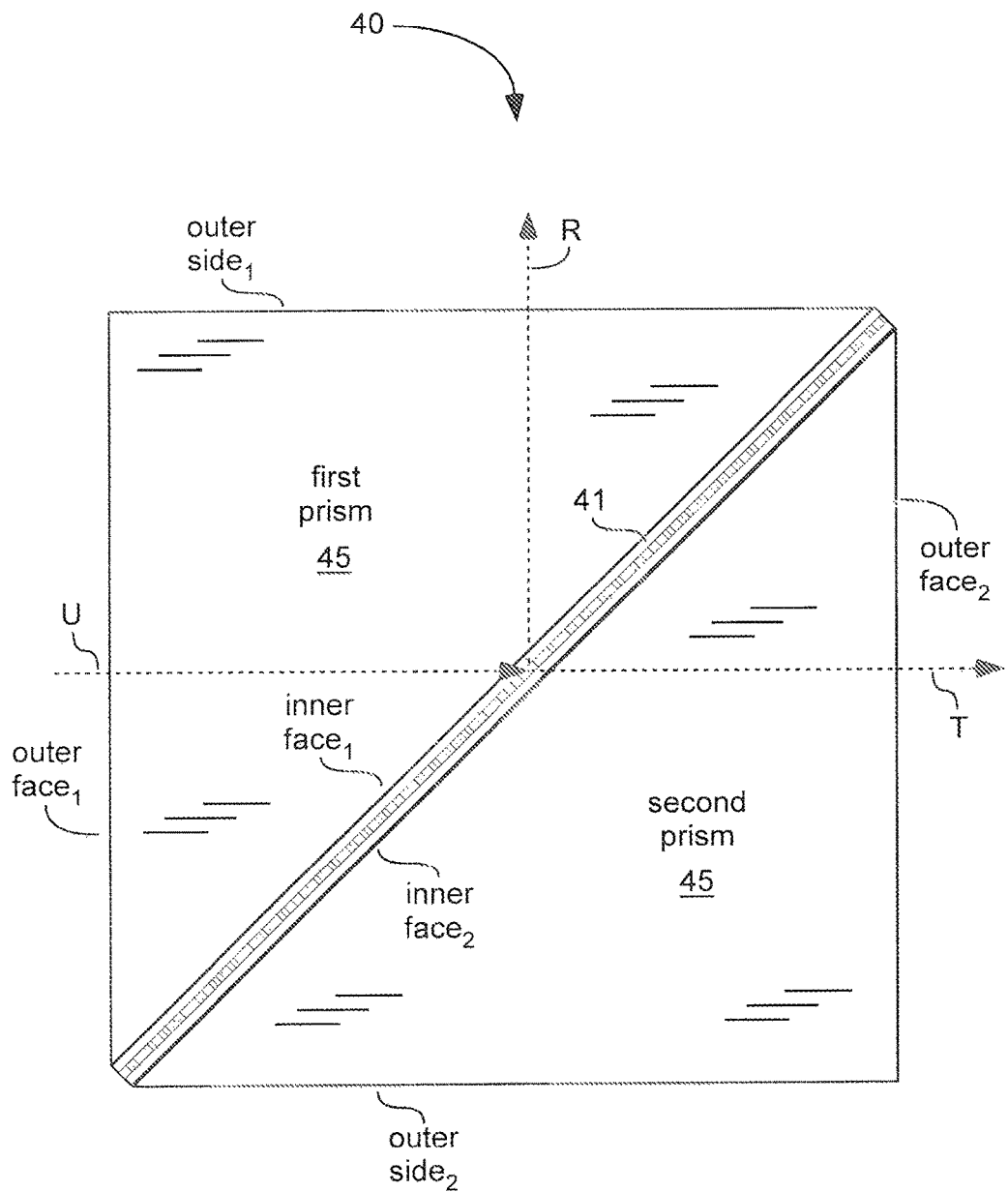
FIG. 7 is a schematic side view of the cube polarizer of FIG. 4, showing an unpolarized beam, a reflected beam, and a transmitted beam, in accordance with an embodiment of the present invention.

Cube symmetry, due to combined wire grid polarizer symmetry and prism symmetry, can allow equal, or substantially equal optical path lengths as described below and shown in FIG. 7. An unpolarized beam of light U, having a wavelength λ, can enter the cube polarizer 40 through the outer face$_1$ and be polarized at the wire grid polarizer 41, forming (1) a reflected beam R of light reflecting off of the wire grid polarizer 41 and exiting through the outer side$_1$ and (2) a transmitted beam T of light transmitting through the wire grid polarizer 41 and exiting through the outer face$_2$. An absolute value of a difference between an optical path length (OPL$_T$) of the transmitted beam T minus an optical path length (OPL$_R$) of the reflected beam R (|OPL$_T$–OPL$_R$|) can be less than 100*λ in one aspect, less than 10*λ in another aspect, less than 500 micrometers in another aspect, less than 100 micrometers in another aspect, less than 10 micrometers in another aspect, or less than 1 micrometer in another aspect. The optical path length (OPL) is a distance of light travel through a material times an index of refraction of the material.

Curvature of a wire grid polarizer in a cube can cause problems. The wire grid polarizer can curve due to stresses induced by the wires, or other thin films adjacent to the wires. This curvature can result in a reflected light beam from one region of the polarizer having a different optical path length than a reflected light beam from another region of the polarizer, thus causing wavefront distortion. There can be a similar problem with the transmitted beam.

Figure 8:
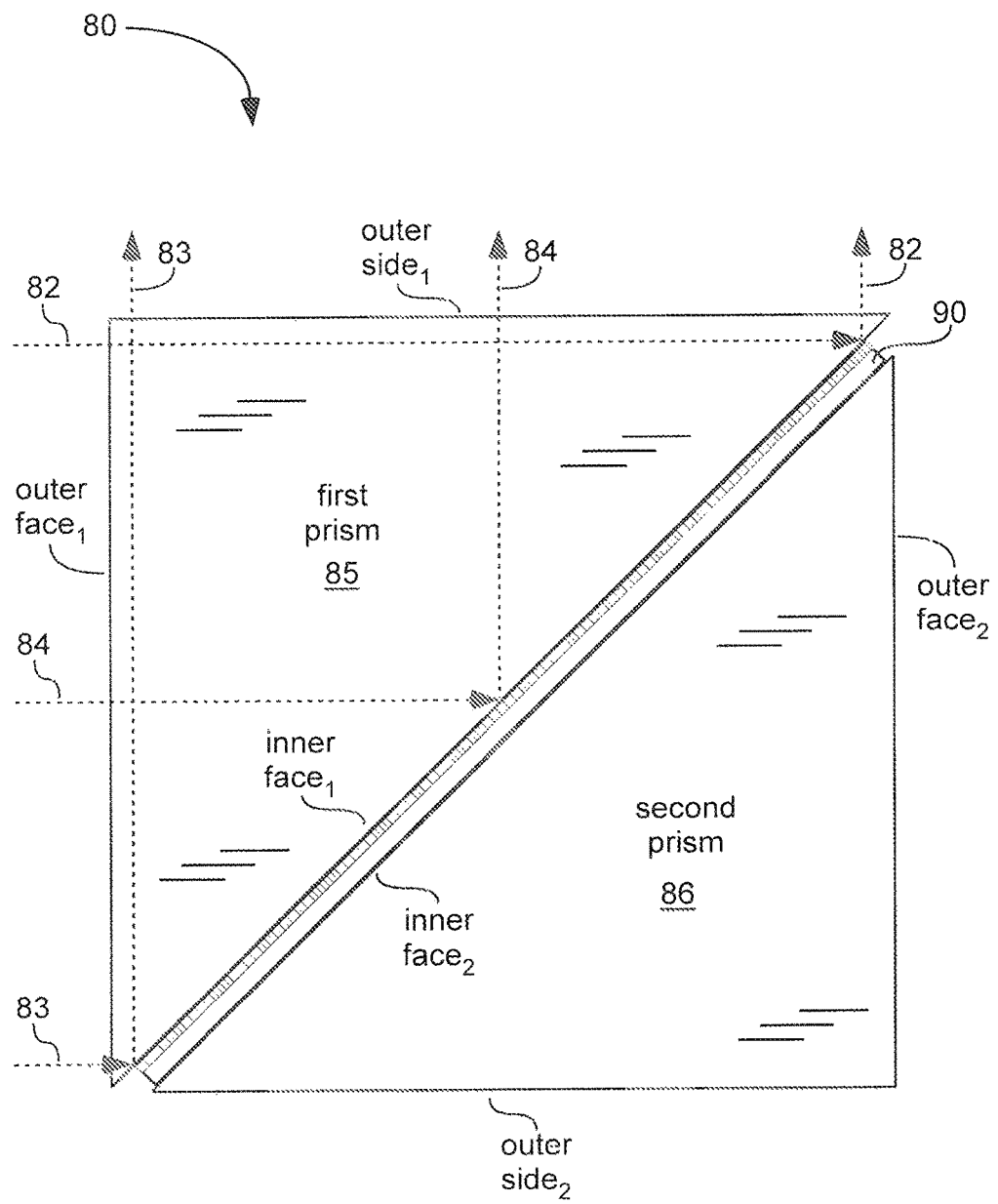
FIG. 8 is a schematic side view of a cube polarizer, with a wire grid polarizer having a thin film disposed over a back side of the substrate in order to flatten the wire grid polarizer, in accordance with an embodiment of the present invention.

This curvature problem can be solved or improved as shown on cube polarizer 80 and wire grid polarizer 90 in FIGS. 8 and 9 and as described below. The cube polarizer 80 can be designed for polarization of light including a wavelength λ.

The cube polarizer 80 can include a first prism 85 and a second prism 86. The first prism 85 can include two triangular faces linked by an inner face, an outer face (outer face$_1$), and an outer side (outer side$_1$). The second prism 86 can include two triangular faces linked by an inner face, an outer face (outer face$_2$), and an outer side (outer side$_2$).

A wire grid polarizer 90 can be sandwiched between the inner faces of the prisms 85 and 86. The wire grid polarizer 90 can include a substrate 92 having a first surface 92$_f$ and an opposite second surface 92$_s$ substantially parallel to the first surface 92$_f$. There can be a material (material$_1$) 96 disposed over the first surface 92$_f$ of the substrate 92. The material$_1$ 96 can include an array of parallel, elongated, separated wires 91 (separated by gaps G). Material$_1$ 96 can also include other thin films 93 and/or 94 as will be described below. There can be a thin film (thin film$_2$) 95 disposed over the second surface 92$_s$. The thin film$_2$ 95 can balance stresses caused by material$_1$ 96, thus reducing curvature of the wire grid polarizer 90 and reducing wavefront distortion.

This reduced wavefront distortion can be demonstrated by minimal variation of optical path lengths of light beams, such as for example light beams 82-84. Light beams, including light beams 82-84, can enter through the outer face$_1$, can reflect off of portions of the wire grid polarizer 90 within the cube polarizer 80, then can exit through the outer side$_1$. Light beams can reflect off of all portions of the wires 91 of the wire grid polarizer 90 within the cube polarizer 80. These light beams can include (1) a light beam having a shortest optical path length (OPL$_S$) and (2) a light beam having a longest optical path length (OPL$_L$). Optical path length is a distance of light travel through a material times an index of refraction of the material. A difference between the OPL$_L$ and the OPL$_S$ defines a peak to valley (PTV). In other words, |OPL$_L$−OPL$_S$|=PTV. The thin film$_2$ 95 can include a material and a thickness to reduce a curvature of the wire grid polarizer 90 such that the PTV is less than λ/2 in one aspect, less than λ/4 in another aspect, less than λ/8 in another aspect, less than 500 nanometers in another aspect, less than 350 nanometers in another aspect, or less than 100 nanometers in another aspect.

One way for the thin film$_2$ 95 to balance stresses caused by the material$_1$ 96 is for the thin film$_2$ to include a same material as in the material$_1$ 96. For example, if the material$_1$ includes silicon dioxide, then the thin film$_2$ can also include silicon dioxide; or if the material$_1$ includes titanium dioxide, then the thin film$_2$ can also include titanium dioxide. Another way for the thin film$_2$ 95 to balance stresses caused by the material$_1$ 96 is to have similar thicknesses between the thin film$_2$ 95 and the material$_1$ 96.

Use of the thin film$_2$ 95 for reduction of wavefront distortion can also be used in cube polarizers 10 and 40. Thus, the benefits of reduced wavefront distortion can be combined with the benefits of equalizing optical path lengths of reflected and transmitted beams.

Shown in FIG. 9 is a wire grid polarizer 90 which can be used in the various cube polarizers 10, 40, and 80 described above. Specifics of this design, including materials and thicknesses, can improve overall cube polarizer performance. A first thin film 93 can fill gaps G between the wires 91 and can extend above the wires 91. The first thin film 93 can comprise silicon dioxide. The first thin film 93 can extend above the wires 91 for a thickness th$_{93}$ of between 40 and 120 nanometers. A second thin film 94 can be disposed over the first thin film 93. The second thin film 94 can comprise titanium dioxide. The second thin film 94 can have a thickness th$_{94}$ of between 50 and 150 nanometers. If a thin film$_2$ 95 is disposed over the second surface 92$_s$ of the substrate, for reduced wire grid polarizer 90 curvature, then this thin film$_2$ 95 can include silicon dioxide having a thickness th$_{95}$ of between 80 and 300 nanometers.

In some applications of cube polarizers, both the reflected beam R and the transmitted beam T are used and it may be desirable to reflect one polarization as much as possible. In other applications, it can be beneficial to suppress or absorb the reflected beam R. For example, the reflected beam R may interfere with other devices in the system where the cube polarizer is used. Shown in FIG. 12 is a wire grid polarizer 120 which can be used in the various cube polarizers 10, 40, and 80 described above. For cube polarizer 10, 40, or 80, designed to polarize light including a wavelength λ, the wires 91 can include a layer of metal 121 and a layer of a material (absorptive layer) 122 that is substantially absorptive of light having the wavelength λ. The cube polarizer 10, 40, or 80 can polarize an incoming beam of light having the wavelength λ into a first beam that is primarily reflected or absorbed by the wires 91 and a second beam that is primarily transmitted through the wires 91. At least 75% of the first beam can be absorbed by the wires in one aspect, at least 85% in another aspect, or at least 92% in another aspect.

The prisms in the cube polarizers 10, 40, and 80 described herein can be triangular prisms. The inner faces, outer sides, and outer faces of the prisms can have a parallelogram shape, can be rectangular, can be square, but need not be such shapes. The two triangular faces of each prism can be parallel or substantially parallel to each other, but such relationship is not required. The prisms and the wire grid polarizer substrates can be made of a material that is substantially transparent of the desired light wavelength band (e.g. glass for visible light). In one embodiment, the wires 91 can extend longitudinally in the direction of one triangular face to the other triangular face of each prism (into the page in the figures).

What is claimed is:

1. A cube polarizer comprising:
   a) a first prism including two triangular faces linked by an inner face, an outer face, and an outer side;
   b) a second prism including two triangular faces linked by an inner face, an outer face, and an outer side;
   c) a wire grid polarizer including an array of parallel, elongated, separated wires sandwiched between a first substrate and a second substrate, a thickness of the first substrate and a thickness of the second substrate are both greater than 0.4 millimeters; and
   d) the wire grid polarizer, the first substrate, and the second substrate being sandwiched between the inner faces of the prisms.

2. The cube polarizer of claim 1, wherein a thickness of the first substrate and a thickness of the second substrate are both greater than 0.5 millimeters.

3. The cube polarizer of claim 1, wherein a thickness of the first substrate and a thickness of the second substrate are between 0.4 and 1.4 millimeters.

4. The cube polarizer of claim 1, wherein a thickness of the first substrate equals a thickness of the second substrate.

5. The cube polarizer of claim 1, further comprising a first thin film disposed above the wires, and wherein a thickness of the first substrate equals a combined thickness of the second substrate and the first thin film.

6. The cube polarizer of claim 1, wherein a size of the two triangular faces of the first prism equals a size of the two triangular faces of the second prism.

7. The cube polarizer of claim 6, wherein the first prism is made of the same material as the second prism.

8. The cube polarizer of claim 1, wherein:
a) a junction of the inner face of the first prism and the outer side of the first prism defines a first edge of the first prism;
b) a junction of the inner face of the second prism and the outer face of the second prism defines a third edge of the second prism;
c) a plane of the outer face of the second prism crosses perpendicularly a plane of the outer side of the first prism at a first junction;
d) a distance between the first edge of the first prism and the first junction equals a distance between the third edge of the second prism and the first junction.

9. The cube polarizer of claim 8, wherein
a) a junction of the inner face of the first prism and the outer face of the first prism defines a third edge of the first prism;
b) a junction of the inner face of the second prism and the outer side of the second prism defines a first edge of the second prism;
c) a plane of the outer side of the second prism crosses perpendicularly a plane of the outer face of the first prism at a second junction;
d) a distance between the first edge of the second prism and the second junction equals a distance between the third edge of the first prism and the second junction.

10. The cube polarizer of claim 1, wherein:
a) an unpolarized beam of light, having a wavelength $\lambda$, entering the cube polarizer through the outer face of the first prism, is polarized at the wire grid polarizer, forming:
  i) a reflected beam of light reflecting off of the wire grid polarizer and exiting through the outer side of the first prism; and
  ii) a transmitted beam of light transmitting through the wire grid polarizer and exiting through the outer face of the second prism, and
b) $|OPL_T - OPL_R| < 100*\lambda$, where $OPL_T$ is an optical path length of the transmitted beam T, $OPL_R$ is an optical path length of the reflected beam R, and optical path length is a distance of light travel through a material times an index of refraction of the material.

11. The cube polarizer of claim 10, wherein $|OPL_T - OPL_R| < 10*\lambda$.

12. The cube polarizer of claim 10, wherein $|OPL_T - OPL_R| < 500$ micrometers.

13. The cube polarizer of claim 10, wherein $|OPL_T - OPL_R| < 10$ micrometers.

14. The cube polarizer of claim 10, wherein $|OPL_T - OPL_R| < 1$ micrometer.

15. The cube polarizer of claim 1, wherein:
a) an unpolarized beam of light entering the cube polarizer through the outer face of the first prism, is polarized at the wire grid polarizer, forming:
  i) a reflected beam of light reflecting off of the wire grid polarizer and exiting through the outer side of the first prism; and
  ii) a transmitted beam of light transmitting through the wire grid polarizer and exiting through the outer face of the second prism, and
b) $|OPL_T - OPL_R| < 500$ micrometers, where $OPL_T$ is an optical path length of the transmitted beam T, $OPL_R$ is an optical path length of the reflected beam R, and optical path length is a distance of light travel through a material times an index of refraction of the material.

16. A cube polarizer comprising:
a) a first prism including two triangular faces linked by an inner face, an outer face, and an outer side;
b) a second prism including two triangular faces linked by an inner face, an outer face, and an outer side;
c) a wire grid polarizer including an array of parallel, elongated, separated wires sandwiched between a first substrate and a second substrate;
d) the wire grid polarizer, the first substrate, and the second substrate being sandwiched between the inner faces of the prisms;
e) a thickness of the first substrate equals a thickness of the second substrate and both are greater than 0.4 millimeters; and
f) the first prism is made of a same material as the second prism.

17. A cube polarizer designed for polarization of light including a wavelength $\lambda$, the cube polarizer comprising:
a) a first prism including two triangular faces linked by an inner face, an outer face, and an outer side;
b) a second prism including two triangular faces linked by an inner face, an outer face, and an outer side;
c) a wire grid polarizer including:
  i) a substrate having a first surface and an opposite second surface substantially parallel to the first surface;
  ii) a material, disposed over the first surface, including an array of parallel, elongated, separated wires; and
  iii) a thin film disposed over the second surface;
d) the wire grid polarizer sandwiched between the inner faces of the prisms;
e) a distance of light travel through a material times an index of refraction of the material defining an optical path length;
f) light beams entering through the outer face of the first prism, reflecting off of portions of the wire grid polarizer within the cube polarizer, then exiting through the outer side of the first prism include:
  i) a light beam having a shortest optical path length ($OPL_S$); and
  ii) a light beam having a longest optical path length ($OPL_L$);
g) a difference between the longest optical path length ($OPL_L$) and the shortest optical path length ($OPL_S$) defines a peak to valley (PTV); and
h) the thin film disposed over the second surface includes a material and a thickness to reduce a curvature of the wire grid polarizer such that the peak to valley (PTV) is less than half the wavelength $\lambda$.

18. The cube polarizer of claim 17, wherein the peak to valley PTV is less than 350 nanometers.

19. The cube polarizer of claim 17, wherein the thin film disposed over the second surface includes a same material as the material disposed over the first surface of the substrate of the wire grid polarizer.

20. The cube polarizer of claim 17, wherein:
a) the thin film disposed over the second surface comprises silicon dioxide and has a thickness of between 80 and 300 nanometers;
b) the material disposed over the first surface further comprises a first thin film comprising silicon dioxide, filling gaps between the wires, and extending above the wires for a thickness between 40 and 120 nanometers; and
c) the cube polarizer further comprises a second thin film comprising titanium dioxide, disposed over the first thin film, and having a thickness of between 50 and 150 nanometers.

* * * * *